US006795536B1

(12) United States Patent
Ronca

(10) Patent No.: US 6,795,536 B1
(45) Date of Patent: Sep. 21, 2004

(54) AUTOMATIC USER PREFERENCE SELECTION FOR MESSAGE PLAYBACK BASED ON CALLER LINE IDENTIFICATION DATA

(75) Inventor: David Randall Ronca, San Jose, CA (US)

(73) Assignee: Mitel, Inc., Herndon, VA (US)

( * ) Notice: Subject to any disclaimer, the term of this patent is extended or adjusted under 35 U.S.C. 154(b) by 0 days.

(21) Appl. No.: 09/258,717

(22) Filed: Feb. 26, 1999

(51) Int. Cl.[7] .............................................. H04M 1/64
(52) U.S. Cl. ............................. 379/88.25; 379/88.18; 379/85; 379/87
(58) Field of Search ..................... 379/67, 68, 88.12, 379/88.13, 88.17, 88.18, 88.22, 100.01, 100.08, 88.25, 88.14

(56) References Cited

U.S. PATENT DOCUMENTS

| | | | |
|---|---|---|---|
| 5,243,643 A | | 9/1993 | Sattar et al. |
| 5,329,578 A | * | 7/1994 | Brennan et al. ............ 379/196 |
| 5,349,636 A | | 9/1994 | Irribarren |
| 5,377,354 A | | 12/1994 | Scannell et al. |
| 5,440,615 A | | 8/1995 | Caccuro et al. |
| 5,524,137 A | * | 6/1996 | Rhee ...................... 379/100.08 |
| 5,530,740 A | | 6/1996 | Irribarren et al. |
| 5,568,540 A | | 10/1996 | Greco et al. |
| 5,682,525 A | * | 10/1997 | Bouve et al. ............... 340/995 |
| 5,687,220 A | * | 11/1997 | Finnigan .................. 379/88.22 |
| 5,737,395 A | | 4/1998 | Irribarren |
| 5,742,905 A | * | 4/1998 | Pepe et al. .................. 455/461 |
| 5,841,966 A | | 11/1998 | Irribarren |
| 5,859,898 A | * | 1/1999 | Checco .................... 379/88.01 |
| 5,870,454 A | * | 2/1999 | Dahlen ..................... 379/88.14 |
| 5,987,100 A | * | 11/1999 | Fortman et al. ......... 379/88.14 |
| 6,026,291 A | * | 2/2000 | Carlsson et al. ............ 455/405 |
| 6,058,180 A | * | 5/2000 | Young ................... 379/211.01 |
| 6,122,348 A | * | 9/2000 | French-St. George et al. ...................... 379/100.04 |
| 6,157,924 A | | 12/2000 | Austin |
| 6,203,192 B1 | | 3/2001 | Fortman |

FOREIGN PATENT DOCUMENTS

| | | |
|---|---|---|
| EP | 0 539 102 A2 | 4/1993 |
| GB | 2 305 070 A | 3/1997 |
| WO | WO95/20859 | 8/1995 |
| WO | WO95/29451 | 11/1995 |
| WO | WO96/35994 | 11/1996 |

* cited by examiner

Primary Examiner—Allan Hoosain
Assistant Examiner—Simon P. Sing
(74) Attorney, Agent, or Firm—Beyer Weaver & Thomas, LLP

(57) ABSTRACT

A messaging system to store and retrieve messages for playback in response to input user commands includes memory to store user messages. The messaging system also maintains preference records associated with users of the messaging system. Each preference record is associated with a communication device used by a user to access the messaging system and includes user preference data for message playback. A messaging application is responsive to incoming calls from users to playback messages for that user stored in the memory. The messaging application accesses preference records associated with a user calling the messaging system and plays back the messages in accordance with a selected one of the preference records. In one embodiment, the selected one of the preference records is selected based on caller line identification (CLI) data accompanying the call made to the messaging system.

31 Claims, 2 Drawing Sheets

AUTOMATIC USER PREFERENCE SELECTION FOR MESSAGE PLAYBACK BASED ON CALLER LINE IDENTIFICATION DATA

CROSS-REFERENCE TO RELATED APPLICATIONS

This application is related to: (i) U.S. patent application Ser. No. 09/258,507, filed on same day herewith, entitled "TEXT-TO-SPEECH CONVERTER"; (ii) U.S. patent application Ser. No. 09/259,811 (now U.S. Pat. No. 6,418, 200), filed on same day herewith, entitled "AUTOMATIC SYNCHRONIZATION OF ADDRESS DIRECTORIES FOR UNIFIED MESSAGING"; and (iii) U.S. patent application Ser. No. 09/259,463, filed on same day herewith, entitled "DIAL BY NAME FEATURE FOR MESSAGING SYSTEM"; all of which are all incorporated herein by reference for all purposes.

FIELD OF THE INVENTION

The present invention relates to messaging systems and, in particular, to a messaging system which selects communication parameters based on the communication device used to access the messaging system.

BACKGROUND OF THE INVENTION

Voice messaging systems are common in today's business community.

Most business organizations or enterprises make use of a private branch exchange (PBX) to direct a caller's telephone call to the appropriate extension of the called party. If the called party is unable to answer the telephone call, the telephone call is forwarded to a voice messaging system, which allows the caller to leave a voice message in the mailbox assigned to the called party. Messages left for called parties within the business organization can be retrieved from memory by calling the voice messaging system using a telephone and entering appropriate commands via a touch-tone keypad. Retrieved messages can be played, forwarded or deleted. An example of a voice messaging system of this nature is the Series 6 sold by Mitel Corporation of Ottawa, Ontario, Canada.

In addition to voice messages, communications within business organizations are also stored in facsimile and text formats. In the past, separate messaging systems have been used to handle these different types of communications. Unfortunately, prior art messaging systems designed to handle one type of communication have not provided any means to interact with messaging systems handling other types of communications. This has required users to access each messaging system individually to retrieve messages and has required business organizations to maintain and manage multiple messaging systems separately. As a result, it has been necessary to establish separate accounts, address lists and message mailboxes in each messaging system for the various users in the business organizations.

More recently, attempts have been made to interconnect different messaging systems to provide access to different types of messages from a single point. For example, U.S. Pat. No. 5,349,636 to Irribarren discloses a system and method for voice mail systems and interactive voice response (IVR) systems. The Irribarren system includes a voice message system and a text message system integrated via a network, which coordinates the functions of each individual message system. A user may access messages stored in the voice message system and in the text message system via a single telephone call. Although this system allows access to different types of messages, the voice message and text message systems require separate management.

The current trend is to integrate these various messaging systems to allow users to access all types of communications once a connection is made to the messaging system. To that end, unified messaging systems have been developed to provide users access to virtually all of their communications. Messaging systems of this nature store all messages for entities within the enterprise at a common location. The entities may be individuals, groups, departments or any appropriate logical organizations. Users accessing the messaging system via a telephone, desktop computer or other communication device, have access to all of their messages regardless of message type and regardless of the type of communication device used to access the messaging system. Appropriate message translators such as text-to-speech (TTS) converters, speech-to-text (STT) converters, etc. are included to enable users to retrieve messages stored in formats not supported by the communication devices used to access the messaging system.

In today's mobile world, users must often access messaging systems from different locations using different types of communication devices. For example, during travel a user may be required to access their messaging system using a cellular telephone, an air phone, a regular telephone, etc. Cellular telephones and air phones are often noisy and hence, when a user accesses their messaging system using a communication device of this nature, it is typically desired that the volume at which the messaging system plays back messages be loud. In fact, depending on the type of communication device used to access the messaging system, the user may have different preferences with respect to the volume and speed at which messages are to be played back as well as the type and order messages are played back.

Conventional messaging systems allow users to adjust message playback parameters. However, the message playback parameters must be adjusted by users each time the current message playback parameters do not suit the users+ current calling needs. If a user is traveling and is frequently using different types of communication devices to access the messaging system, the user may be required to adjust the message playback parameters each time the messaging system is accessed. The end result is often user frustration.

Thus, there is a need for messaging systems that offer better management of message playback parameters.

SUMMARY OF THE INVENTION

The present invention relates to a messaging system which automatically selects message playback parameters based on the communication device used to access the messaging system. Examples of message playback parameters that are used when playing back a message to a user include volume, speed, order, and type.

According to one aspect of the present invention there is provided a messaging system to store and retrieve messages for playback in response to input user commands that includes: memory to store user messages; preference records associated with users of said messaging system, each preference record being associated with a communication device used by a user to access said messaging system and including user preference data for message playback; and a messaging application responsive to incoming calls from users, said messaging application accessing certain of said preference records associated with a user calling said messaging system and playing back messages for that user stored in said memory in accordance with a selected one of said certain of said preference records.

Preferably, the selected one of the preference records is selected based on the communication device used by the user to call the messaging system. In a specific embodiment, the selected one of the preference records is selected based on caller line identification (CLI) data accompanying the call made to the messaging system using the communication device. Preferably, multiple preference records are associated with each user of the messaging system. One of the multiple preference records is designated as a default and is selected by the messaging application for message playback when no CLI data accompanies the call. The remaining multiple preference records are associated with selected CLI data.

In a preferred embodiment, each of the preference records includes a plurality of preference data fields. Each of the preference data fields stores a different parameter preference for message playback. In a specific embodiment, the preference data fields include a volume data field, a speed data field, a message type data field and a message order data field.

According to another aspect of the present invention there is provided in a messaging system which stores and retrieves messages for user playback in response in input commands, a method of playing back messages to a user accessing said messaging system using a communication device comprising the operations of: selecting message playback parameters based on the communication device used by said user to access said messaging system; and playing back messages to said user in accordance with the selected playback parameters.

In still yet another aspect of the present invention there is provided in a messaging system which stores and retrieves messages for user playback, a method of playing back messages to a user accessing said messaging system via a call comprising the operations of: examining said call to determine if caller line identification (CLI) data accompanies the call; selecting default message playback parameters and playing back messages to said user in accordance with the default message playback parameters when no CLI data accompanies said call; and selecting specific message playback parameters associated with said CLI data and playing back messages to said user in accordance with the specific message playback parameters when CLI data accompanies said call.

The present invention provides advantages in that the manner in which messages are played back to a user is dependent on the communication device used by the user to access the messaging system and is accordance with the user's preferences for that communication device. In one embodiment, the message playback parameters are selected automatically based on CLI data provided to the messaging system by a private branch exchange (PBX).

BRIEF DESCRIPTION OF THE DRAWINGS

The present invention will now be described more fully with reference to the accompanying drawings in which.

DETAILED DESCRIPTION OF THE INVENTION

The present invention relates to a messaging system which automatically selects message playback parameters such as for example, volume, speed, order, type, etc. based on the communication device used to access the messaging system. The communication device can be a variety of devices that can access the messaging system. As an example, the communication device can be a cellular telephone, an air phone, or a land-based telephone.

In one embodiment, the messaging system uses caller line identification (CLI) data accompanying telephone calls to the messaging system to select message playback parameters. The present invention can be implemented in virtually any type of messaging system such as voice messaging systems, interactive voice response (IVR) systems, voice and text messaging systems, and unified messaging systems. An embodiment of the present invention implemented in a unified messaging system will now be described.

Figure 1:
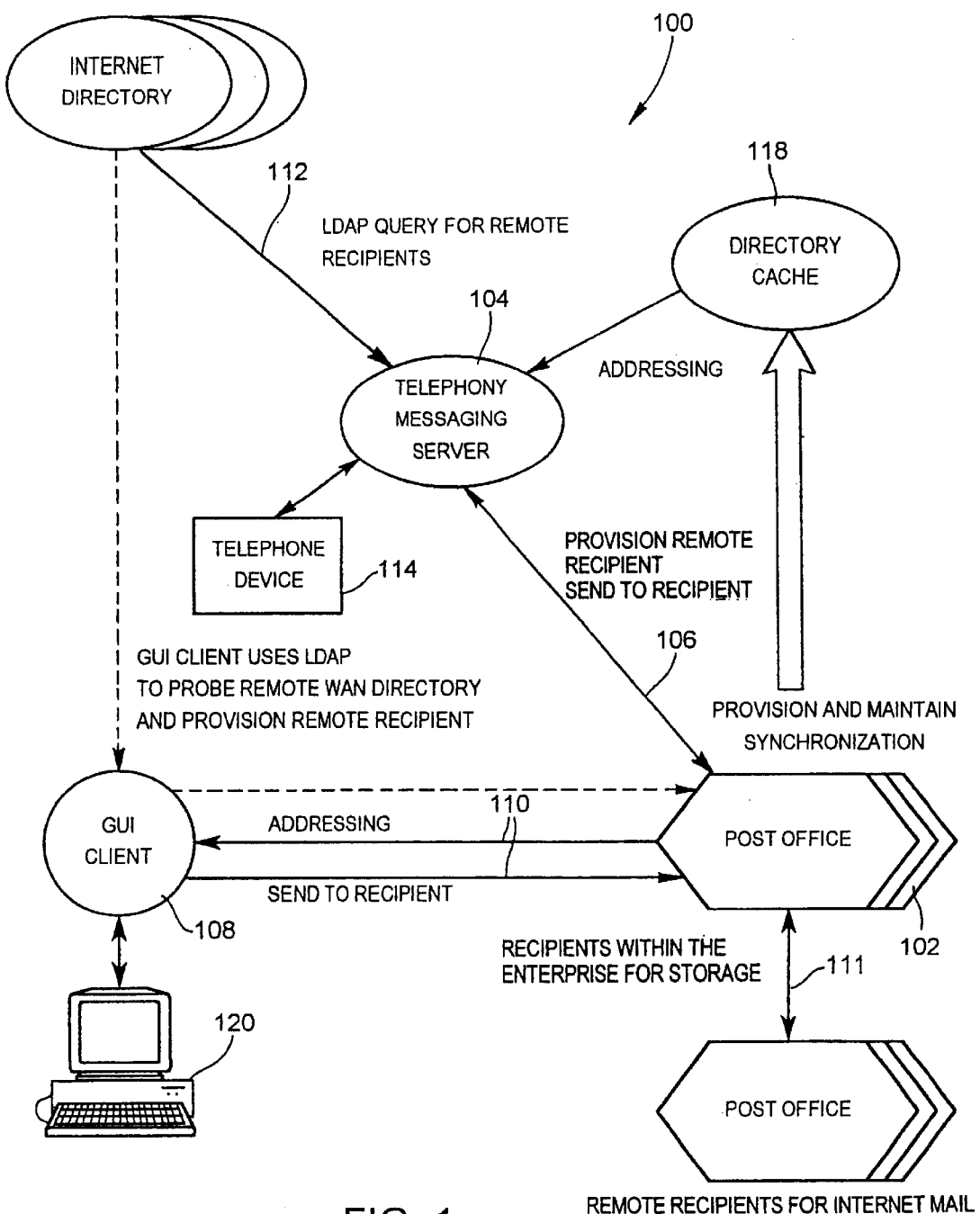
FIG. 1 is a schematic diagram of a messaging system which automatically selects message playback parameters in accordance with the present invention.

Turning now to FIG. 1, a messaging system is shown and is generally indicated to by reference numeral 100. Messaging system 100 includes a post office 102 communicating with a telephony messaging server 104. The post office 102 runs on one or more servers behaving logically as a single entity and is connected to the telephony server 104 via a local area network 106. Post office 102 communicates with clients 108, only one of which is shown for illustrative purposes, via a local area network, modem or other communication channel 110. Post office 102 and telephony messaging server 104 also communicate with external messaging systems via wide area networks 111 and 112 respectively.

The post office 102 provides message storage and delivery facilities for users of the messaging system 100 and includes mailboxes in which messages for the users are stored. The post office 102 handles and stores user messages regardless of format. Thus, the post office 102 stores voice messages received from the telephony messaging server 104 as well as text messages, facsimile messages, graphics messages, etc. received from client 108 and/or wide area network 111. The post office 102 also maintains a directory database of user information including addresses, locations and addressing related information as well as user preference records as will be described. The directory database information is accessible, retrievable and updatable using database type queries. In the preferred embodiment, post office 102 runs commercially available post office software such as Microsoft Exchange® sold by Microsoft Corporation of Redmond Washington.

In one embodiment, telephony messaging server 104 is a model TS800 telephony server provided by Mitel Corporation of Ottawa, Ontario or similar PC-based model. The telephony messaging server 104 executes a voice messaging application to handle incoming telephone calls which cannot be completed. As is well known to those of skill in the art, the voice messaging application includes a speech file administrator which retrieves prerecorded voice message prompts from a database to direct a caller to leave a message for a particular called party. Messages recorded by the voice messaging application are conveyed to the post office 102 for storage in the appropriate user mailboxes. The voice messaging application also handles incoming user calls to allow users to retrieve messages stored in their mailboxes.

Telephony users may access the voice messaging application using a typical telephone or telephony device 114 providing telephone functions that is either directly connected to telephony messaging server 104 or connected to the telephony messaging server 104 through a private branch exchange (PBX) and a publicly switched telephone network PSTN (not shown). During access, users enter touchtone commands and passwords to retrieve messages from their mailboxes in the post office 102. The voice messaging application calls the speech file administrator, which provides the appropriate voice message prompts to navigate users through the voice messaging application. During message playback, if a message stored in a user's mailbox is in a format not supported by the telephone or telephony device 114 used to access the messaging system 100, the voice messaging application calls an appropriate message translator such as a text-to-speech converter, to convert the message into a form which can be played back to the user.

The telephony messaging server 104 communicates with a directory cache 118 that is updated by the post office 102. The directory cache 118 stores a subset of the information stored by the post office 102. Specifically, the directory cache stores addressing information for users and groups associated with the messaging system. The telephony messaging server 104 accesses the directory cache 118 in response to user and caller queries made via a telephone device 114 to reduce directory search times and provide a fast addressing service. Further specifics of the directory cache are described in U.S. patent application Ser No. 09/259,811 (now U.S. Pat. No. 6,418,200), filed on same day herewith, entitled "AUTOMATIC SYNCHRONIZATION OF ADDRESS DIRECTORIES FOR UNIFIED MESSAGING", the contents of which are incorporated herein by reference.

Client 108 in this embodiment, is associated with or in the form of a computing device such as a personal computer 120. Through personal computer 120, a user can access voice messages, facsimile messages, electronic mail messages, etc. stored in their post office mailbox. The user can also use personal computer 120 to perform messaging functions such as create, attach, read, modify, reply, forward, store and delete messages of various types. In one embodiment, the personal computer 120 runs Microsoft Outlook® client messaging software sold by Microsoft Corporation. The client messaging software provides a graphical user interface (GUI) to display the user's messages held in their post office mailbox and to allow the user to invoke messaging functions. Since the mailboxes store messages in different formats, it is preferred that the personal computer 120 includes appropriate hardware and software to allow all message types to be retrieved. In cases where the personal computer 120 does not include the hardware and/or software necessary to support certain message types, appropriate message translators can be called to convert the messages into a form compatible with the personal computer 120.

Associated with each user mailbox in the post office 102 is one or more user preference record. The user preference records establish preferred communicating parameters for message playback depending on the type of communication device used to access the messaging system 100. For mailboxes having more than one associated user preference record, one of the user preference records is designated as a default.

Figure 2:
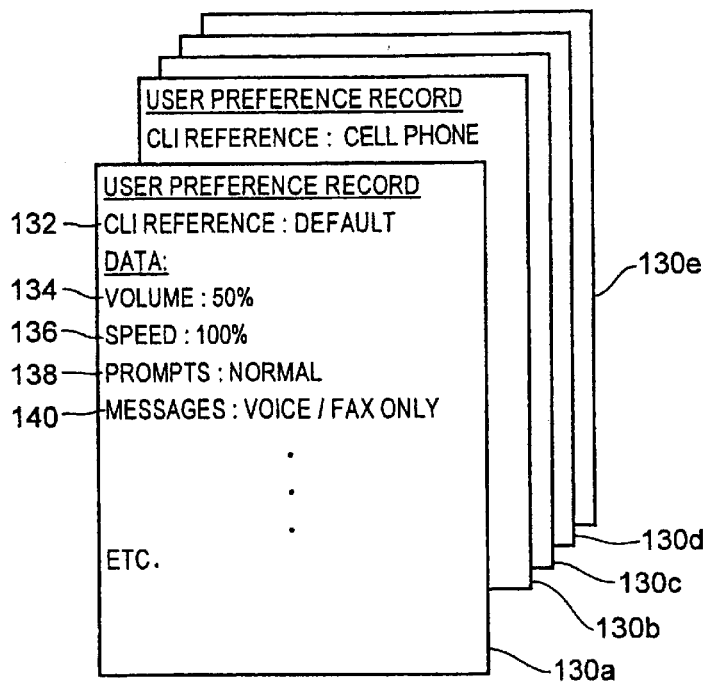
FIG. 2 shows a number of user preference records stored in the messaging system of FIG. 1.

Turning now to FIG. 2, a plurality of user preference records 130a to 130e associated with one of the user mailboxes in the post office 102 is shown. As can be seen, each user preference record 130 has a caller line identification (CLI) data field 132 and a number of preference data fields 134 to 140. The CLI data field 132 associates the user preference record 130 with a particular communication device. The preference data fields 134 to 140 establish preferred communicating parameters for that communication device and include for example, a volume field 134, a speed field 136, a prompts field 138, a message field 140 along with any other fields for which the user has a preference. The volume field 134 allows the volume at which messages are played back by the messaging system 100 to be set. The speed field 136 allows the speed at which the messaging system 100 plays back messages to be set. The prompt field 138 allows the type and form of the prompts to be used (i.e., normal or abbreviated) to be set. The message field 140 allows the types of messages as well as the order in which those messages are played back to be set. Although specific preference data fields are shown in FIG. 2, those of skill in the art will appreciate that additional or fewer as well as different preference data fields can be provided in the preference records 130.

As will be appreciated, a user preference record 130 can be created for each type of communication device a user typically uses to access the messaging system 100. A user can therefore establish a user preference record for their desktop telephone and/or their office personal computer, their home telephone, their cellular telephone, etc. In this manner, the user can condition the messaging system 100 to playback messages in a manner best suited to the communication device used to access the messaging system 100.

Figure 3:
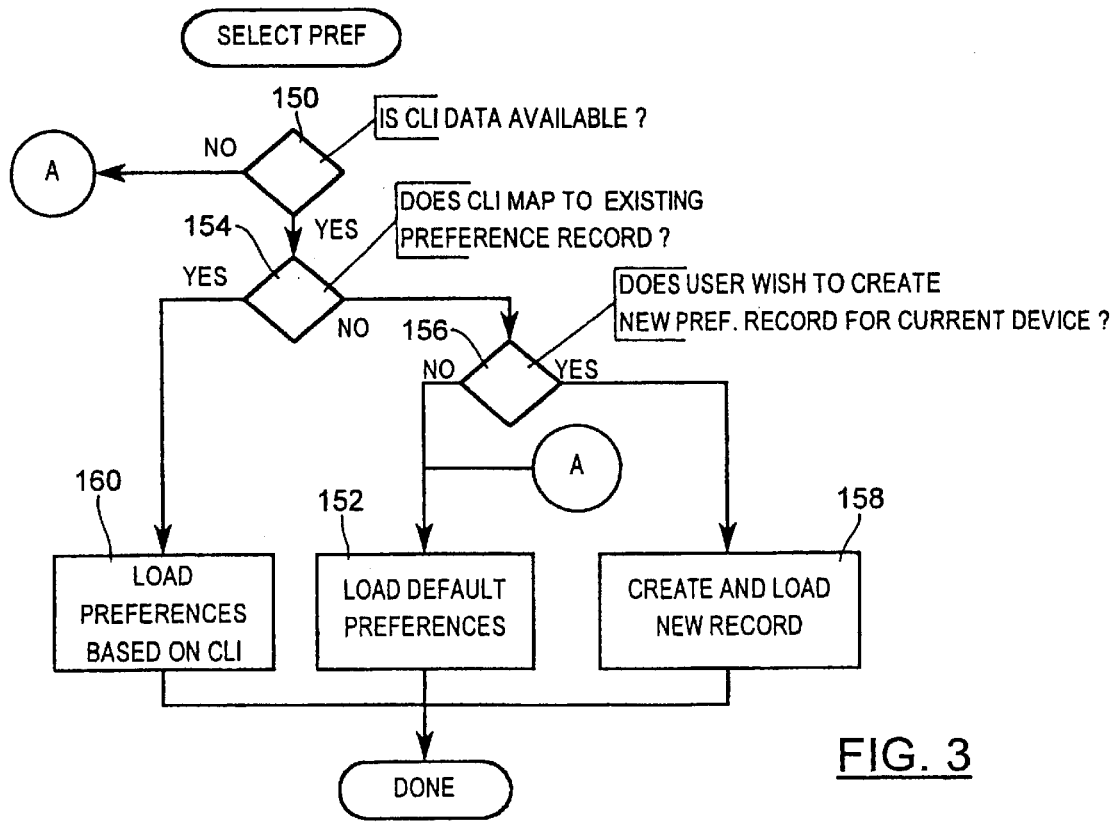
FIG. 3 is a flow chart showing operations performed by the messaging system of FIG. 1 during message playback.

The manner in which messages are played back to a user accessing the messaging system 100 will now be described with particular reference to FIG. 3. When a user calls into the messaging system 100 to retrieve messages using a telephone or telephone device 114, the voice messaging application calls the speech file administrator which in turn selects the appropriate voice message prompt instructing the user to enter their password via a touch-tone keypad. Upon entry of the proper password, the voice messaging application firstly determines if CLI data accompanies the call (block 150). CLI data, also known as caller ID, is often provided with a call to identify the caller. As an example, CLI data is a typical telephone number. The CLI data can be provided to the messaging system from external equipment or internally by a private branch exchange (PBX). If no CLI data is available, the voice messaging application loads a user's default user preference record 130a stored in the post office 102 (block 152). If the user enters touch-tone commands to play back messages, the voice messaging application uses the information in the preference data fields 134 to 140 of the default user preference record 130a to establish the volume, speed, type and order, prompts, etc. by which messages stored in the user's post office mailbox are played back to the user.

If CLI data from a PBX accompanies the user's call, the voice messaging application compares the CLI data with the CLI data in the user preference records 130 associated with the user. If the CLI data accompanying the call does not correspond with CLI data in the user preference records, the voice messaging application calls the speech file administrator. The speech file administrator in turn retrieves a voice message prompt from the database asking the user if the user wishes to create a user preference record corresponding to the received CLI data (block 156). If the user enters a negative response via the touch-tone keypad, the voice messaging application loads the default user preference record 130a (block 154). The information in the preference data fields of the default user preference record 130a is then used to establish the manner by which messages are played back to the user if the user enters touch-tone commands to play back messages.

However, if the user wishes to create a user preference record for the CLI data, the voice messaging application creates a new user preference record for the CLI data (block 158). Here, the voice messaging application calls the speech file administrator to prompt the user to enter preference data for the various preference data fields in the user preference record being created via the touch-tone keypad. Once the new user preference record is completed, the user preference record is stored in the post office 102. The new user preference record is also loaded by the voice messaging application and is used by the voice messaging application to establish message play back parameters (block 158).

If the received CLI data corresponds (e.g., maps) with CLI data in a user preference record, the voice messaging application loads that user preference record that corresponds to the user's call (block 160). The information in the preference data fields is then used by the voice messaging application to establish the manner by which messages are played back to the user if the user enters touch-tone commands to play back messages.

The voice messaging application is also responsive to user commands entered via the touch-tone keypad to allow a user to specify a selected user preference record to be used during a particular call even though the CLI data accompanying the call may correspond with CLI data in another user preference record. The voice messaging application is also responsive to user commands input via the touch-tone keypad to allow a user to access selected user preference records and change the values in the preference data fields therein regardless of the communication device used to call into the messaging system 100. As will be appreciated, a user may also access and update their user preference records through personal computer 120 shown in FIG. 1.

If desired, the telephony messaging server 104 can be programmed to monitor usage of user preference records and artificial intelligence can be used to adjust automatically certain user preference records over time based on usage habits. Also, a system administrator can be programmed and used to establish rules to inhibit access to certain user preference records during specific hours or during high traffic periods. In this case, the system administrator overrides the selection of user preference records based on CLI data.

Also, if desired, the step of prompting the user to create a new preference record at block 156 each time a call is made using a new communication device can be omitted. In this case, when the CLI data does not correspond with CLI data in the user preference records, the voice messaging application loads the default user preference record (block 154). New preference records for communication devices can be created by entering appropriate touch-tone commands.

Although certain embodiments of the present invention have been described, those of skill in the art will appreciate that variations and modifications may be made without departing from the spirit and scope thereof as defined by the appended claims.

I claim:

1. A messaging system for storing and retrieving messages for playback in response to commands input by a user accessing said messaging system via a voice telephony device, said messaging system comprising:

memory storing messages directed to users of said messaging system in mailboxes associated with said users;
a user programmable default preference record associated with each user of said messaging system, each default preference record having data fields at least specifying the volume and speed by which messages in the mailbox of the associated user are to be played back when the voice telephony device used by said user to access said messaging system is unknown;
an additional user programmable preference record associated with at least one user of said messaging system, each additional preference record being associated with a designated voice telephony device and having data fields at least specifying the volume and speed by which messages in the mailbox of the associated user are to be played back when said user uses said designated voice telephony device to access said messaging system; and
a messaging application responsive to incoming calls from users, in response to such an incoming call, said messaging application determining if data identifying the voice telephony device used to make said incoming call accompanies said incoming call, if said identifying data accompanies said incoming call, said messaging application further determining if an additional preference record exists that is associated with the voice telephony device used to make said incoming call, if so said messaging application playing back messages for the user as specified by said additional preference record and if not, said messaging application playing back messages for the user as specified by said default preference record.

2. A messaging system according to claim 1 wherein said data fields further include a message type data field and a message order data field, said message type and message order data fields determining the type of messages and order by which messages are played back by said messaging system.

3. A messaging system according to claim 1 wherein said messaging application plays back messages for the user as specified by said default preference record when no identifying data accompanies said incoming call.

4. A messaging system according to claim 3 wherein said identifying data is caller line identification (CLI) data and wherein each additional preference record includes CLI data associated with the designated voice telephony device.

5. A messaging system according to claim 4 wherein additional preference records are associated with a plurality of users of said messaging system.

6. A messaging system according to claim 5 wherein each default preference record is also associated with a designated voice telephony device.

7. A messaging system according to claim 5 wherein said messaging application prompts said user to create a new additional preference record when CLI data accompanies said incoming call and an additional preference record that includes the CLI data does not exist.

8. A messaging system according to claim 5 wherein said messaging application is responsive to input user commands to select a user specified preference record irrespective of CLI data accompanying said call.

9. A messaging system according to claim 5 further including an administrator to inhibit said messaging application from accessing certain preference records at preselected times.

10. A messaging system according to claim 9 wherein said preselected times correspond to high traffic periods.

11. A messaging system according to claim 7 wherein said messaging application plays back messages for the user as specified by said default preference record when said user elects not to create a new additional preference record.

12. A messaging system according to claim 1 wherein each default and additional preference record specifies the types of messages to be played back.

13. A messaging system according to claim 12 wherein additional preference records are associated with a plurality of users of said messaging system.

14. A messaging system according to claim 13 wherein each default preference record is also associated with a designated voice telephony device.

15. A messaging system according to claim 14 wherein said messaging application adjusts the preference records automatically based on a selection made by said associated user to alter the manner by which messages in the mailbox of the associated user are played back.

16. A messaging system according to claim 14 wherein said messaging application updates said preference records in response to user input touch-tone commands.

17. A messaging system for storing and retrieving messages for playback in response to commands input by a user accessing said messaging system via a voice telephony device, said messaging system comprising:
   memory storing messages directed to users of said messaging system in mailboxes associated with said users;
   a default preference record associated with each user of said messaging system, each default preference record having data fields specifying the type or types of messages and the volume and speed by which those messages in the mailbox of the associated user are to be played back when the voice telephony device used by said user to access said messaging system is unknown;
   additional preference records associated with a plurality of users of said messaging system, each additional preference record being associated with a designated voice telephony device and having data fields specifying the type or types of messages and the volume and speed by which those messages in the mailbox of the associated user are to be played back when said user uses said designated voice telephony device to access said messaging system; and
   a messaging application responsive to incoming calls from users, in response to such an incoming call, said messaging application determining if data identifying the voice telephony device used to make said incoming call accompanies said incoming call, if said identifying data accompanies said incoming call, said messaging application further determining if an additional preference record exists that is associated with the voice telephony device used to make said incoming call, if so said messaging application playing back messages for the user as specified by said additional preference record and if not, said messaging application playing back messages for the user as specified by said default preference record.

18. A messaging system according to claim 17 wherein said messaging application plays back messages for the user as specified by said default preference record when no identifying data accompanies said incoming call.

19. A messaging system according to claim 18 wherein said identifying data is caller line identification (CLI) data and wherein each additional preference record includes CLI data associated with the designated voice telephony device.

20. A messaging system according to claim 19 wherein each default preference record is also associated with a designated voice telephony device.

21. A messaging system according to claim 20 wherein said messaging application prompts said user to create a new additional preference record when CLI data accompanies said incoming call and an additional preference record that includes the CLI data does not exist.

22. A messaging system according to claim 21 wherein said messaging application plays back messages for the user as specified by said default preference record when said user elects not to create a new additional preference record.

23. A messaging system according to claim 17 wherein each default and additional preference record further includes an order data field determining the order by which said messaging application plays back messages.

24. A messaging system according to claim 23 wherein said messaging application is responsive to input user commands to select a specified preference record irrespective of CLI data accompanying said incoming call.

25. A messaging system according to claim 24 further including an administrator to inhibit said messaging application from accessing certain additional preference records at pre-selected times.

26. A messaging system according to claim 25 wherein said pre-selected times correspond to high traffic periods.

27. A messaging system according to claim 26 wherein said messaging application adjusts the preference records automatically based on a selection made by said associated user to alter the manner by which messages in the mailbox of the associated user are played back.

28. A messaging system according to claim 27 wherein said messaging application updates said preference records in response to user input touchtone commands.

29. In a messaging system including memory storing messages directed to users of said messaging system in mailboxes associated with said users and a messaging application retrieving stored messages for playback in response to commands input by a user accessing said messaging system via a call made using a voice telephony device, a method of playing back messages to a user accessing said messaging system comprising the steps of:
   (i) examining said call to determine if caller line identification (CLI) data accompanies the call;
   (ii) if no CLI data accompanies said call, selecting user default message playback parameters and playing back messages to said user at a volume and speed as specified by the default message playback parameters;
   (iii) if CLI data accompanies said call, determining if user programmed message playback parameters associated with the CLI data exist;
   (iv) if user programmed message playback parameters associated with the CLI data exist, playing back messages to said user at a volume and speed as specified by the user programmed message playback parameters; and
   (v) if no user programmed message playback parameters associated with the CLI data exist, playing back messages to said user at a volume and speed as specified by the default message playback parameters.

30. The method of claim 29 further comprising the steps of:
   prior to step (v), prompting said user to create user programmed message playback parameters for the CLI data; and
   if user programmed message playback parameters are created, bypassing step (v) and playing back messages to said user as specified by the created user programmed message playback parameters.

31. The method of claim 20 wherein said message playback parameters also specify speed, the type and order of message playback.

* * * * *